United States Patent [19]
Quint et al.

[11] Patent Number: 5,621,567
[45] Date of Patent: Apr. 15, 1997

[54] BINOCULAR VIEWING DEVICE AND ITS ASSEMBLY PROCESS

[75] Inventors: Jean-François Quint, Sarcelles; Michel Saint-Sevin, Gagny; Daniel Savoye, Dijon; Denis Guettier, Charny, all of France

[73] Assignee: SFIM Optronique Pour La Defense Et Le Spatial, Velizy-Villacoublay, France

[21] Appl. No.: 416,377

[22] Filed: Apr. 4, 1995

[30] Foreign Application Priority Data

Apr. 12, 1994 [FR] France ................... 94 04324

[51] Int. Cl.$^6$ ............ G02B 23/18; G02B 23/12; G02B 23/02
[52] U.S. Cl. ............ 359/407; 359/409; 359/431
[58] Field of Search ............ 359/403, 404, 359/407, 409, 410, 419, 835, 861, 431

[56] References Cited

U.S. PATENT DOCUMENTS

| | | | |
|---|---|---|---|
| 4,383,741 | 5/1983 | Vogl et al. | 359/419 |
| 4,398,788 | 8/1983 | Dietz | 350/550 |
| 4,568,153 | 2/1986 | Baluteau | 350/538 |
| 5,235,458 | 8/1993 | Akagi et al. | 359/410 |
| 5,414,557 | 5/1995 | Phillips | 359/428 |
| 5,469,293 | 11/1995 | Fantone | 359/412 |

FOREIGN PATENT DOCUMENTS

| | | |
|---|---|---|
| 0042324 | 12/1981 | European Pat. Off. . |
| 2065325 | 6/1981 | United Kingdom . |
| 8700639 | 1/1987 | WIPO ................... 359/407 |

Primary Examiner—Timothy P. Callahan
Assistant Examiner—Eunja Shin
Attorney, Agent, or Firm—Nikaido, Marmelstein, Murray & Oram LLP

[57] ABSTRACT

An asymmetric binocular viewing device having a first and a second optical axis forming a horizontal plane. A single objective, a related luminance intensifier tube, a semi-reflecting optical image splitter and a first ocular are aligned in succession the first optical axis. A second ocular related to the optical image splitter by an optical image transmitting system is aligned on the second optical axis. The optical image transmitting system includes in succession a first mirror, an lens system, a second mirror, and a third mirror. The elements are arranged so that an optical path is defined starting from the optical splitter and including a first vertical axis section, a horizontal axis section, and a second vertical axis section describing a U turned upside down in the shape of a bridge located on a vertical plane and perpendicular to both parallel first and second optical axes. This defines a free space between both the first and second oculars freeing up the space for the user.

11 Claims, 5 Drawing Sheets

BINOCULAR VIEWING DEVICE AND ITS ASSEMBLY PROCESS

This invention relates to an asymmetrical binocular viewing device comprising, aligned in succession on a first optical axis: a single objective, a related luminance intensifier tube, a semi-reflecting optical image splitter and a first ocular (eye-piece); and arranged on a second optical axis, parallel to the first and describing with the former a horizontal plane, a second ocular, which is related to the optical image splitter by an optical image transmitting system.

This viewing device is intended for night-time or daylight observation with very low luminosity.

BACKGROUND OF THE INVENTION

A viewing device of this kind is already known by the French patent FR-2.484.658 and enables binocular observation of a single real or overhead image with short focal length. The reduced space requirements and weight of such a viewing device in relation to those known previously enable low cost production of a light and portable instrument. This viewing device is therefore intended for being hand-held or attached to the user's head via a support, for instance a helmet, for civilian or military usage.

As a rule, night-time viewing devices comprise of the following elements:

an objective lens which forms an image of the scene observed on the photocathode of a luminance intensifier tube, the luminance intensifier tube, an ocular (eye-piece) arranged in front of the output screen of the luminance intensifier tube, in the case of binocular viewing devices, an image splitting and transmitting device capable of creating images which can be observed by both of the user's eyes.

Various types of night-time viewing devices are today in operation and can be differentiated from one another by the number, the type and the arrangement of the light intensifier tube(s) or by the image splitting and transmitting device.

All these devices exhibit one or several shortcomings, more or less important, such as:

an excessive price when they possess two light intensifier tubes or when, for compactness reasons, the optical path is too complex, an excessive weight, the centre of gravity located quite ahead of the eyes' position, causing excessive tiredness of the user, the fields of observation of both eyes are asymmetrical or limited, the adjustments are too complex, the system does not make enough space for the observer's nose.

The present invention, in order to remain economical, therefore only uses one luminance intensifier tube and brings a new solution to the problem of image splitting and transmission. This solution, while remaining very economical, obviates all operation shortcomings of the equipment existing today. It also exhibits the advantage of providing the observer with a very widened field of vision, close to the normal field of vision of the eye. This last point is extremely user-friendly and enables the observer to avoid obstacles when moving.

It should be noted here that the main difficulty to overcome for image splitting and transmission is the necessity to observe a small diameter screen, as they are now available, with a wide angle. This requires the usage of oculars whose focal length is slightly greater than the screen diameter.

When the arrangement adopted for the whole device is a symmetrical one, i.e. when the light intensifier tube is located in the centre position, halfway between the oculars' axes, it is not possible, because of the distance between both eyes, to split and to transmit the image using simple mirrors while arranging the tube as close to the eyes as possible. On the contrary, it is necessary to insert image optical transmitting, and possibly, rectifying devices which can be heavy and cumbersome.

If the arrangement adopted is an asymmetrical one, the tube is than located on one of the eyes' axis and can be observed directly by this eye through an ocular. It is relatively easy to obtain, for this eye, a 40° to 50° field of vision. In such a case, image splitting is performed by a prism or a semi-transparent mirror in order to send the image to the other eye.

For the other eye to be able to observe this image with the same apparent angle as the first, an ocular with the same focal length must be used, arranged in such a way that the image to be observed lies in its focal plane. Taking into account the existing distance between the observer's eyes, it is not possible to place this ocular directly in front of the second eye.

A solution, subject of a French patent FR-2.484.658, consists in placing this second ocular close to the image splitting prism and therefore at quite a distance from the second eye. This efficient solution possesses nevertheless the inconvenience of reducing the total field seen by the second eye, in spite of the use of glass prisms spread over the whole path in order to artificially reduce the optical distance.

The solution also had the defect of introducing an important weight in the system and not to leave much space for the user's nose.

SUMMARY OF THE INVENTION

This invention brings about a much more efficient solution to this image transmitting problem. It enables the production of a lighter viewing device, provides a widened field of vision, identical for both eyes and leaves more space for the user's nose.

It is based on an asymmetrical arrangement which places the luminance intensifier tube and the objective lens as close as possible to one of the oculars and is therefore the most favourable one in order to bring the centre of gravity of the assembly closer to the user's head.

Its principle consists in ensuring image splitting and transmission via an extended path using mirrors which will turn images upside down and in using this extension in order to transmit and to rectify images via a combination of light lenses.

The word mirror means here a reflecting system with single reflection, which covers prisms, in addition to classical mirrors.

The invention therefore relates to an asymmetrical binocular viewing device comprising, aligned in succession on a first optical axis: a single objective, a related luminance intensifier tube, a semi-reflecting optical image splitter and a first ocular, and arranged on a second optical axis, parallel to the first optical axis and describing with the first optical axis a horizontal plane, a second ocular which is related to the optical image splitter by an optical image transmitting system.

This viewing device according to the invention is characterised in that the transmitting optical system comprises successively a first mirror, an lens system, a second mirror and a third mirror, whereby these constitutive elements of the optical image transmitting system are arranged in order to describe an optical path starting from the optical splitter and comprising, successively, a vertical axis section, a horizontal axis section and a second vertical axis section describing a U turned upside down, with the shape of a bridge located on a vertical plane and perpendicular to both parallel optical axes, in order to define a free space between both oculars.

Such a configuration remedies all of the short comings mentioned above and frees space between the oculars, judiciously used for easy positioning of the nose.

This invention also relates to the characteristics considered below, individually and according to all their technically possible combinations:

- the optical image splitter is a semi-reflecting cube or blade,
- the viewing device comprises an electrical energy source capable of supplying a light-emitting diode intended for night-time lighting, as well as the luminance intensifier tube, using a single electronic board ensuring conversion of the supply voltage, antiglare safety of the said tube and disconnection of the assembly via a related external switch,
- the voltage of the electrical energy source can be 1.5 V or 3 V,
- the switch can be operated manually or automatically whereby contact is made or suppressed with the support of the viewing device, according to whether the said device in connected or disconnected, by toggling to an articulation used as an interface in relation to the support,
- it comprises a light-emitting diode forming a make-up lighting system actuated by a switch comprising a neutral position, a position in which there is a permanent contact in the absence of a voluntary return, a position in which there is an intermittent contact with automatic return,
- the viewing device comprises, a rear casing containing all of the following optical elements: the optical image splitter, the three mirrors and the lens system making up the optical image transmitting system, as well as the first and second oculars and, a front casing supporting the luminance intensifier tube, the objective and all the following electric or electronic components: the switch, the electrical energy source, the diode, the tube safety device, the board and the safety light-indicators, as well as the articulation means making up an interface in relation to the support,
- the rear and front casings are made of a high pressure moulded plastic material, to form a single piece, individually from one another and assembled at a later stage, after placement of their respective constitutive elements, in relation to a tight common joint plane.

The invention also relates to an assembly process of a night-time binocular viewing device, characterised in that at least the optical image splitter, the first and second mirrors and the lens system making up jointly the optical image transmitter, have been arranged previously and temporarily in a template, according to a very accurate positioning in order to accommodate the rear casing, at a later stage, so that the various elements can be inserted and retained by any means in the same positioning, whereas the third mirror and the oculars are inserted during the same operation or at a later stage.

DETAILED DESCRIPTION OF THE PREFERRED EMBODIMENT

Figure 1:
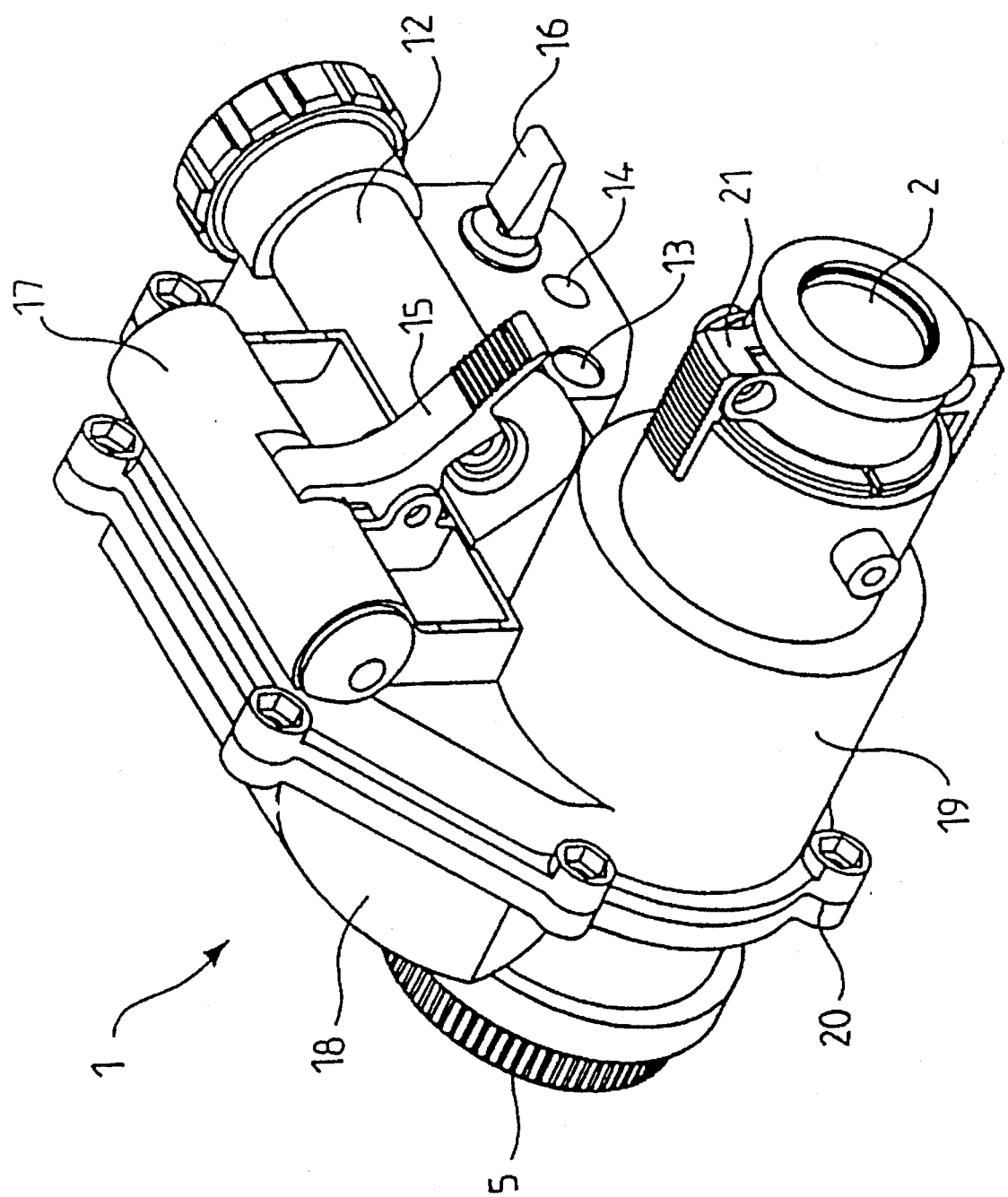
FIG. 1 represents, in a 3/4 front perspective view, a binocular viewing device, according to the invention.

The viewing device 1 shown globally on the Figures, is asymmetrical and comprises, aligned in succession on a first optical axis XX':

- a single objective 2,
- a related luminance intensifier tube 3,
- a semi-reflecting optical image splitter 4,
- a first right-hand side ocular 5, and arranged on a second optical axis YY', parallel to the first XX' and describing with the former, a horizontal plane P:

- a second left-hand side ocular 6 which is related to the optical image splitter 4 by an optical image transmitting system 7 designated globally.

Obviously, the plane P defined by the optical axes XX' and YY' is deemed as horizontal in relation to its position during most common usage of the viewing device. All the other directions will be defined in relation to this same position.

An example of such an optical path is known by the French patent FR-2.484.658, which it will be referred to for further details of embodiments.

According to the invention, the optical image transmitting system 7 comprises successively, starting from the optical splitter 4:

- a first mirror 8,
- an lens system 9,
- a second mirror 10,
- a third mirror 11.

These constitutive elements of the optical image transmitting system 7 are arranged in order to define an optical path starting from the same optical splitter 4 and comprising, successively, a first vertical axis section a, a horizontal axis section b and a second vertical axis section c. These three sections a, b, c, define together a U turned upside down in the shape of a bridge placed on a vertical plane and perpendicular to both parallel optical axes XX' and YY' mentioned above, in order to define a free space E between both oculars, the right-hand side one 5 and the left-hand side one 6, designed for the user's nose.

Figure 3:
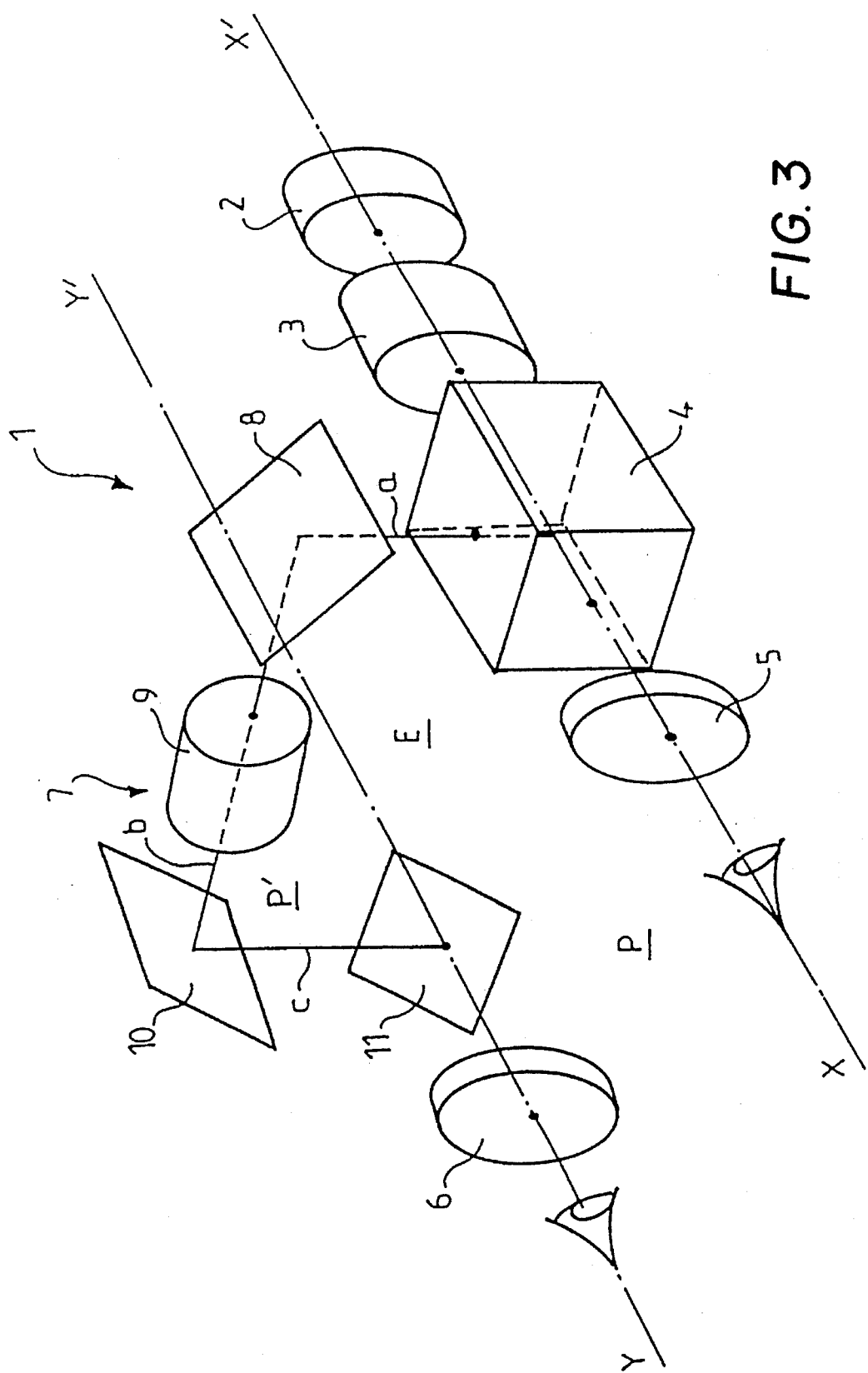
FIG. 3 represents, in perspective view, the optical path of the viewing device according to FIGS. 1 and 2.
Figure 4:
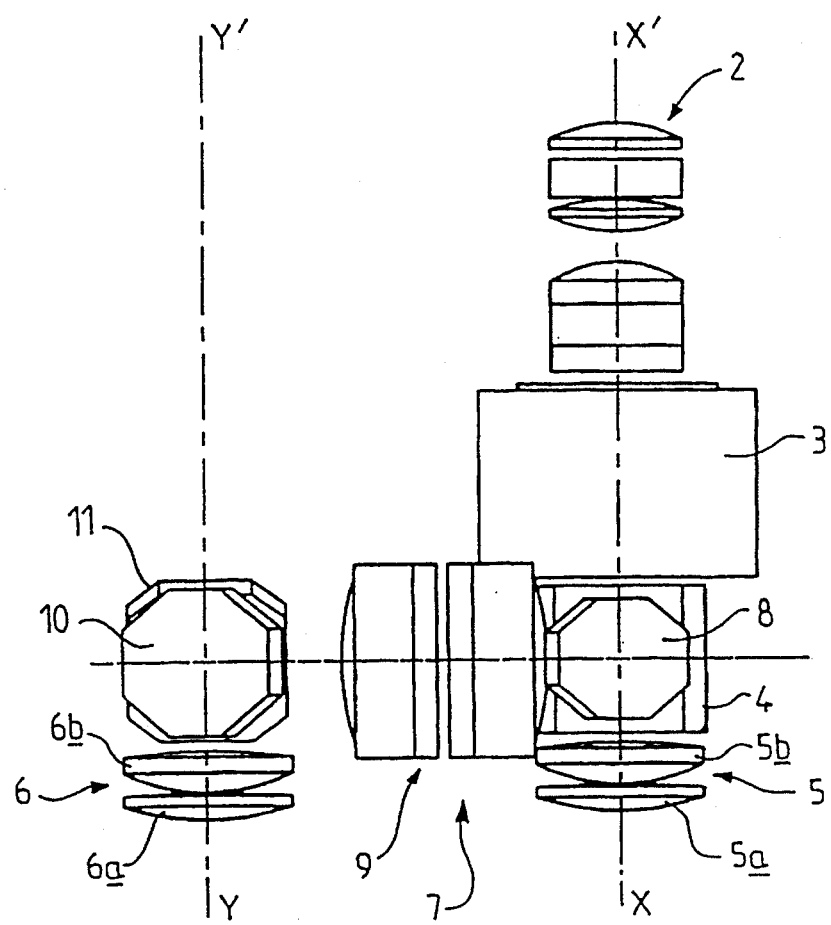
FIG. 4 represents, seen from above, the optical path of the viewing device according to FIGS. 1 and 2.
Figure 5:
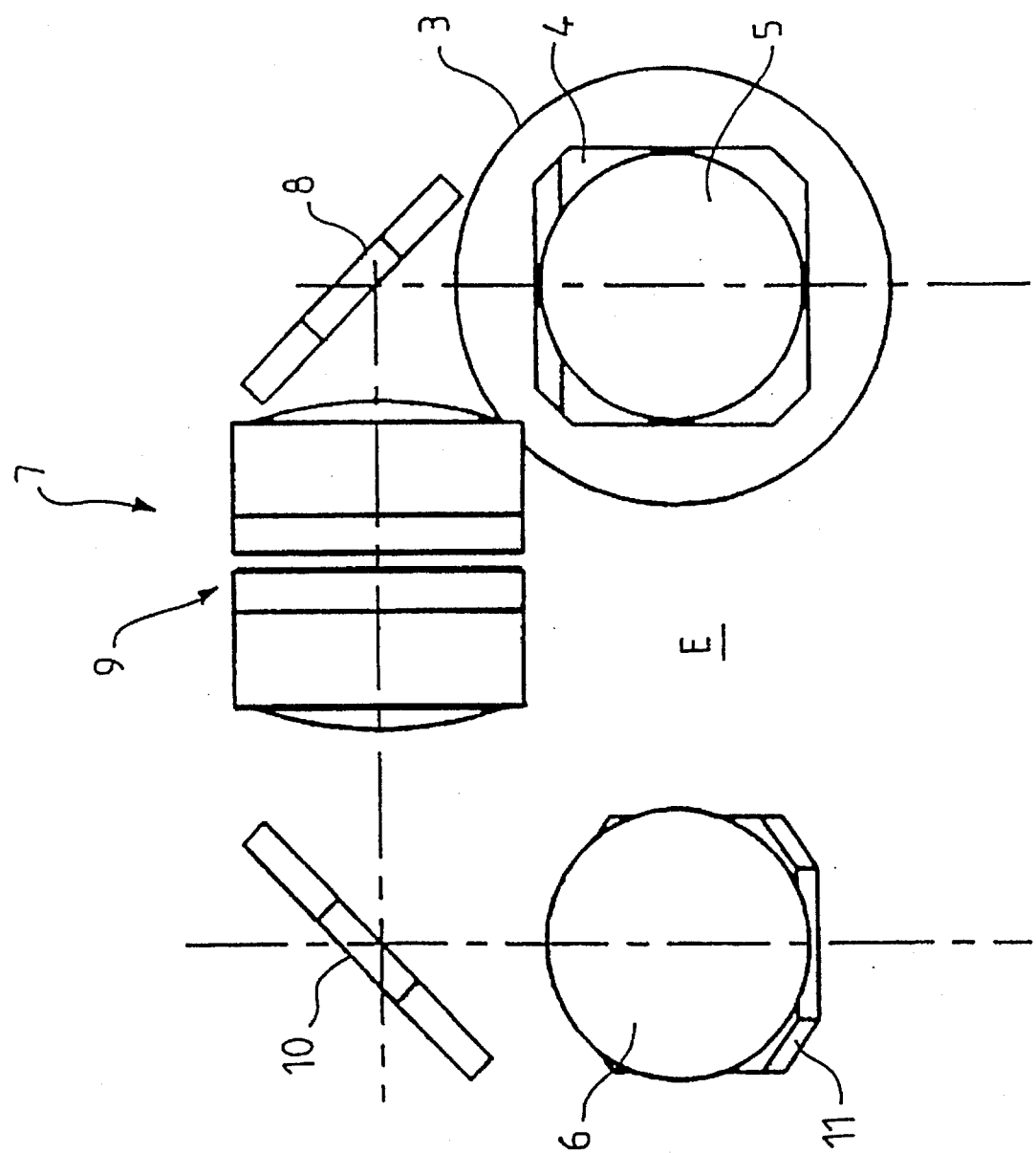
FIG. 5 represents, seen from the rear, the optical path of the viewing device according to FIGS. 1 and 2.

FIG. 3 illustrates especially the optical path which has just been defined and on which the mirror 8 is arranged at the meeting point of the a and b sections making an angle of 45° with the second mirror 10, which is arranged at the meeting point of the b and c sections, making an angle of 45° with the first mirror 8.

The lens system 9 is located on the b horizontal section between the mirrors 8 and 10.

The third mirror 11 is located at the meeting point of the second vertical section c and of the optical axis YY' and makes an angle of 45° with the left ocular 6, in order to reflect towards this ocular 6 the optical information coming from the mirror 10.

The lens system 9 thus enables to bring back the image captured by the objective 2 and transmitted by the tube 3, the optical splitter 4 and the first mirror 8, to the focal point of the left ocular 6, by turning it upside down.

The image is then rectified by the set of mirrors 8, 10, 11 which, combined to the semi-reflecting surface of the splitter, constitute the equivalent of a second generation Porro.

The "Porro" device is a rectifying system which is advantageously compact and comprises two total reflection crossed prisms linking the beam between the objective and the ocular.

As this arrangement frees a large space for the user's nose, it also enables to position the oculars extremely close to his eyes.

Moreover, the optical path from the image supplied by the tube and the second ocular, which is offset, is longer than with the known systems and enables using a wide aperture and less complex optical vehicle 9, thus facilitating the transport of a large image field.

On top of the advantages already mentioned, the arrangement according to the invention also allows to obtain a wide output pupil distance of the right 5 and left 6 oculars. This provides positioning tolerance of the user's eye pupils with respect to the oculars, which makes any distance adjustment useless.

According to another characteristic of the invention, the optical image splitter 4 is a cube, but it can also be a splitting blade.

Figure 2:
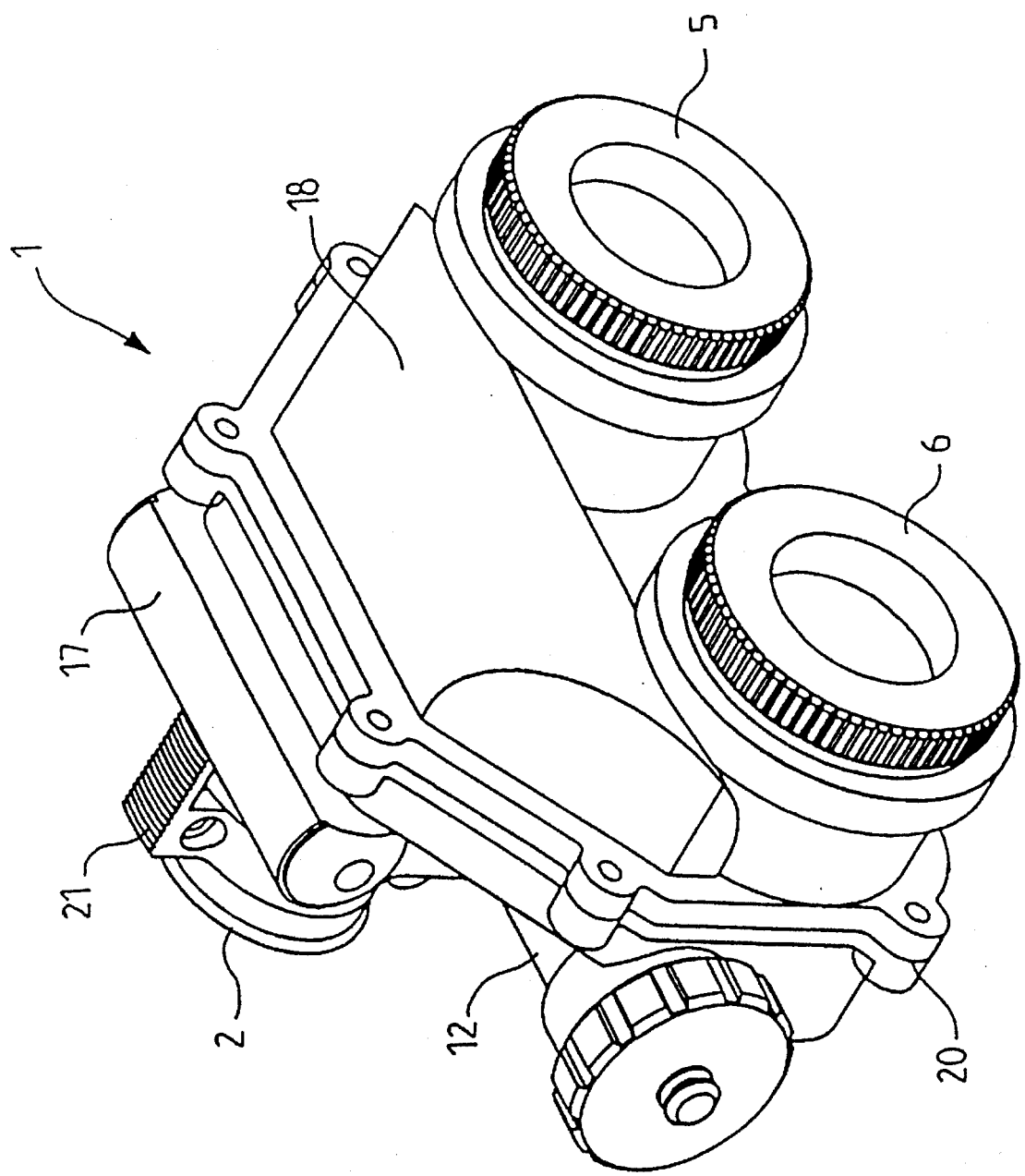
FIG. 2 represents, in perspective view, a binocular viewing device according to the invention, seen for 3/4 rear.

As shown on FIGS 1 and 2, the viewing device 1 also comprises an electric energy source consisting as desired of a 1.5 or 3 volt battery (not visible on the Figures), arranged in a housing 12 and capable of supplying the luminance intensifier tube 3, as well as a light-emitting diode 13 designed for night-time lighting.

This supply goes through a single electronic board (not represented) which fulfils several missions, at the same time: conversion of the supply voltage, safety 14 of the said tube 3 and disconnection of the assembly and of the various safety devices. This last operation is performed via a related external switch 15. Another switch 16 is also available for actuating the light-emitting diode 13, independently.

The switch 15 for disconnection of the assembly can be actuated manually or automatically whereby contact is made or suppressed with the support of the viewing device, for example a helmet, according to whether the device is connected or disconnected.

This automatic control is made by toggling to an articulation 17 used as an interface in relation to the support.

The light-emitting diode 13 is a make-up light source to facilitate close-up viewing.

According to a preferred embodiment of the invention, the switch 16 comprises a neutral position, a position in which there is a permanent contact in the absence of a voluntary return, a position in which there is an intermittent contact with automatic return.

According to another characteristic of the invention, the viewing device 1 comprises, on the one hand, a rear casing 18 containing all the following optical elements: the optical image splitter 4, the three mirrors 8, 10, 11 and the lens system 9 making up the optical image transmitting system 7, as well as the first and second oculars 5 and 6, with the exception of the luminance intensifier tube 3 and the objective 2.

The front casing 19 also carries the control switch 16 of the diode 13.

The viewing device 1 comprises, on the other hand, a front casing 19 carrying the objective 2 and the luminance intensifier tube 3, as well as all the following electric or electronic components: the switch 15, the electric energy source, the diode 13, the safety device 14 of the tube 3 and the board, the safety light-indicators, as well as the articulation means 17 making-up an interface in relation to the support.

The front casing 19 also contains the switch 16 for controlling the diode 13.

A unit 21 controls adjustment of the objective 2.

Advantageously, the rear 18 and front 19 casings are made of high pressure moulded plastic material, to form a single piece, individually from one another and assembled at a later stage, after placement of their respective constitutive elements, in relation to a tight common joint plane 20.

The invention also relates to an assembly process of the viewing device 1 which is particularly advantageous.

This assembly process is remarkable in the sense that at least the optical image splitter 4, the first and second mirrors 8, 10 and the lens system 9 forming jointly the optical image transmitter 7, have been arranged previously and temporarily in a template, according to a very accurate positioning in order to accommodate the rear casing 18, at a later stage, so that the various elements can be inserted and retained by any means in the same positioning, whereas the third mirror 11 and the oculars 5 and 6 are inserted during the same operation or at a later stage.

Alignment of the optical elements is made in relation to the template which has been precision-machined. They are then fixed, for instance glued onto the casing, without this alignment being modified and without the casing requiring either machining or positioning accuracy with respect to the support faces of the optical elements, which would compare to that of the template. As the single template can be used for the production of numerous viewing devices, this simplification is important.

It should be noted here that the third mirror 11 can also be installed at a later stage since the accuracy required for its positioning is not so stringent.

The oculars 5 and 6 are preferably formed by two lenses 5a, 5b and 6a, 6b, whereby the external ones 5a, 6a are made of glass in order to resist scratching better, the internal ones 5b, 6b are made of a die-cast plastic material to make them aspheric more easily and lighter than glass lenses.

What is claimed is:

1. An asymmetrical binocular viewing device comprising, aligned in succession on a first optical axis: a single objective, a related luminance intensifier tube, a semi-reflecting optical image splitter and a first ocular and, arranged on a second optical axis, parallel to the first optical axis and describing with the first optical axis a horizontal plane, a second ocular, which is related to the optical image splitter by an optical image transmitting system, wherein the optical image transmitting system comprises successively a first mirror, an lens system, a second mirror and a third mirror, said optical image transmitting system being arranged so that an optical path is defined, starting from the optical image splitter and comprising, successively, a first vertical axis section, a horizontal axis section and a second vertical axis section describing a U turned upside down, in the shape of a bridge located on a vertical plane and perpendicular to both parallel first and second optical axes, in order to define a free space between both first and second oculars.

2. A viewing device according to claim 1, wherein the optical image splitter is a cube.

3. A viewing device according to claim 1, wherein the optical image splitter is a semi-reflecting blade.

4. A viewing device according to claim 1, further comprising an electrical energy source supplying a light-emitting diode designed for night-time lighting, as well as the luminance intensifier tube, via a single electronic board ensuring at the same time: conversion of the supply voltage, safety of the said tube and disconnection of the assembly via a related external switch.

5. A viewing device according to claim 4, wherein the voltage of the electrical energy source can be equal to 1.5 V or 3 V.

6. A viewing device according to claim 4, wherein the switch can be actuated manually or automatically whereby contact is made or suppressed with a support of the viewing device, according to whether the viewing device is connected or disconnected, by toggling to an articulation means used as an interface in relation to the support.

7. A viewing device according to claim 6, wherein the light-emitting diode forms a make-up lighting system actuated by switch, said switch having a neutral position, a position in which there is a permanent contact in the absence of a voluntary return, a position in which there is an intermittent contact with automatic return.

8. A viewing device according to claim 1, further comprising a rear casing containing all the following optical elements: the optical image splitter, the first, second and third mirrors, the lens system and the first and second oculars, and a front casing supporting the luminance intensifier tube, the single objective, and an articulation means making up an interface in relation to the support.

9. A viewing device according to claim 8, wherein the rear and front casings are made of a high pressure moulded plastic material, to form a single piece, individually from one another and assembled at a later stage, after placement of their respective constitutive elements, in relation to a tight common joint plane.

10. (Amended) An assembly process of an asymmetrical binocular viewing device according to claim 1, wherein least the optical image splitter, the first and second mirrors and the lens system have been arranged previously and temporarily in a template, according to a very accurate positioning in order to accommodate a rear casing, at a later stage of assembly, so that the various elements can be inserted and retained by any means in the same positioning, whereas the third mirror and the oculars are inserted during the same operation or at a later stage.

11. A viewing device according to claim 6, further comprising a rear casing containing all the following optical elements: the optical image splitter, the first, second and third mirrors, the lens system, and the first and second oculars, and a front casing supporting the luminance intensifier tube, the single objective, the following electric or electronic components: the switch, the electric energy source, the diode, a safety device of the tube, the board and safety light-indicators, and the articulation means making up an interface in relation to the support.

* * * * *